(12) United States Patent
Topham et al.

(10) Patent No.: US 7,979,647 B2
(45) Date of Patent: Jul. 12, 2011

(54) METHOD OF STORING DATA ON A SECONDARY STORAGE DEVICE

(75) Inventors: Andrew Topham, Glos (GB); Christopher Martin, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1537 days.

(21) Appl. No.: 10/949,191

(22) Filed: Sep. 27, 2004

(65) Prior Publication Data

US 2008/0133827 A1    Jun. 5, 2008

(30) Foreign Application Priority Data

Oct. 8, 2003 (GB) .................................. 0323487.9

(51) Int. Cl.
*G06F 13/00*    (2006.01)
(52) U.S. Cl. ............ 711/154; 711/4; 711/157; 711/162; 714/7
(58) Field of Classification Search .................. 711/112, 711/154
See application file for complete search history.

(56) References Cited

U.S. PATENT DOCUMENTS

| | | | |
|---|---|---|---|
| 5,212,772 A | 5/1993 | Masters | |
| 5,950,218 A * | 9/1999 | Howard | 711/4 |
| 6,219,799 B1 * | 4/2001 | Kandasamy | 714/4 |
| 6,349,294 B1 * | 2/2002 | Shaath et al. | 707/2 |
| 6,487,644 B1 | 11/2002 | Huebsch | |
| 6,631,442 B1 * | 10/2003 | Blumenau | 711/112 |
| 6,842,841 B1 * | 1/2005 | Kuik et al. | 711/203 |
| 2002/0059172 A1 | 5/2002 | Muhlestein | |
| 2002/0107877 A1 | 8/2002 | Whiting | |
| 2003/0126361 A1 * | 7/2003 | Slater et al. | 711/114 |

FOREIGN PATENT DOCUMENTS

WO    03/025795    3/2003

OTHER PUBLICATIONS

"LTO Technology and Sorage Area Networks" from http://www.lto-technology.com/newsite/html/about_white.html.
Search Report under Section 17, GB 0323487.9, Mar. 5, 2004.
Further Search Report under Section 17, GB 0323487.9, Apr. 29, 2004.
Examination Report under Section 18(3), GB0114239.7, Sep. 15, 2004.

* cited by examiner

*Primary Examiner* — Brian R Peugh
*Assistant Examiner* — Kalpit Parikh (57) ABSTRACT

A backup method relies on a single secondary storage device, such as a tape storage device, which emulates multiple secondary storage devices. The emulated secondary storage devices are coupled to data sources. Data which is received from the data sources is tagged with respective unique identifiers, interleaved and stored on a removable storage medium, such as a tape. This facilitates maximum usage of the media access bandwidth of the single secondary storage device.

22 Claims, 6 Drawing Sheets

Prior Art

METHOD OF STORING DATA ON A SECONDARY STORAGE DEVICE

FIELD OF THE INVENTION

This invention generally relates to computer systems and more particularly to backup systems and methods.

BACKGROUND AND PRIOR ART

Most computer users employ some sort of data protection procedures and devices to protect computer system files and data files in the event of an accidental delete, corruption or overwrite of these files from the primary storage medium, or the failure or loss of the storage medium, which is usually the computer's hard drive. Computer data protection systems usually involve the backup of system and data files onto some sort of secondary storage device utilizing removable storage media, such as floppy disk drives, other hard disk drives, tape drives, etc. More sophisticated users may utilize automatic data protection devices and procedures that backup the entire system on a regular basis, allowing for a full system recovery if needed.

For example, tape backup systems are used to protect data files and other information from computer system failures such as hard disk crashes or computer virus attacks. A tape backup system stores this data on removable off-line media (i.e., the tape); this data can then be retrieved in the event of data loss. Conventional backup systems typically provide the end user with a choice of making a "full" backup or an "incremental" or "modified" backup. Full backups make complete copies of all the data on the computer to a set of one or more backup tapes. Incremental backups are generally much smaller than full backups since they simply save the data that has been changed since either the last full backup or the most recent incremental backup. Examples of such prior art backup systems are described in U.S. Pat. No. 5,276,860, U.S. Pat. No. 5,758,067, U.S. Pat. No. 6,212,512, U.S. Pat. No. 6,330,570 and WO 01/31431 A2.

Figure 1:
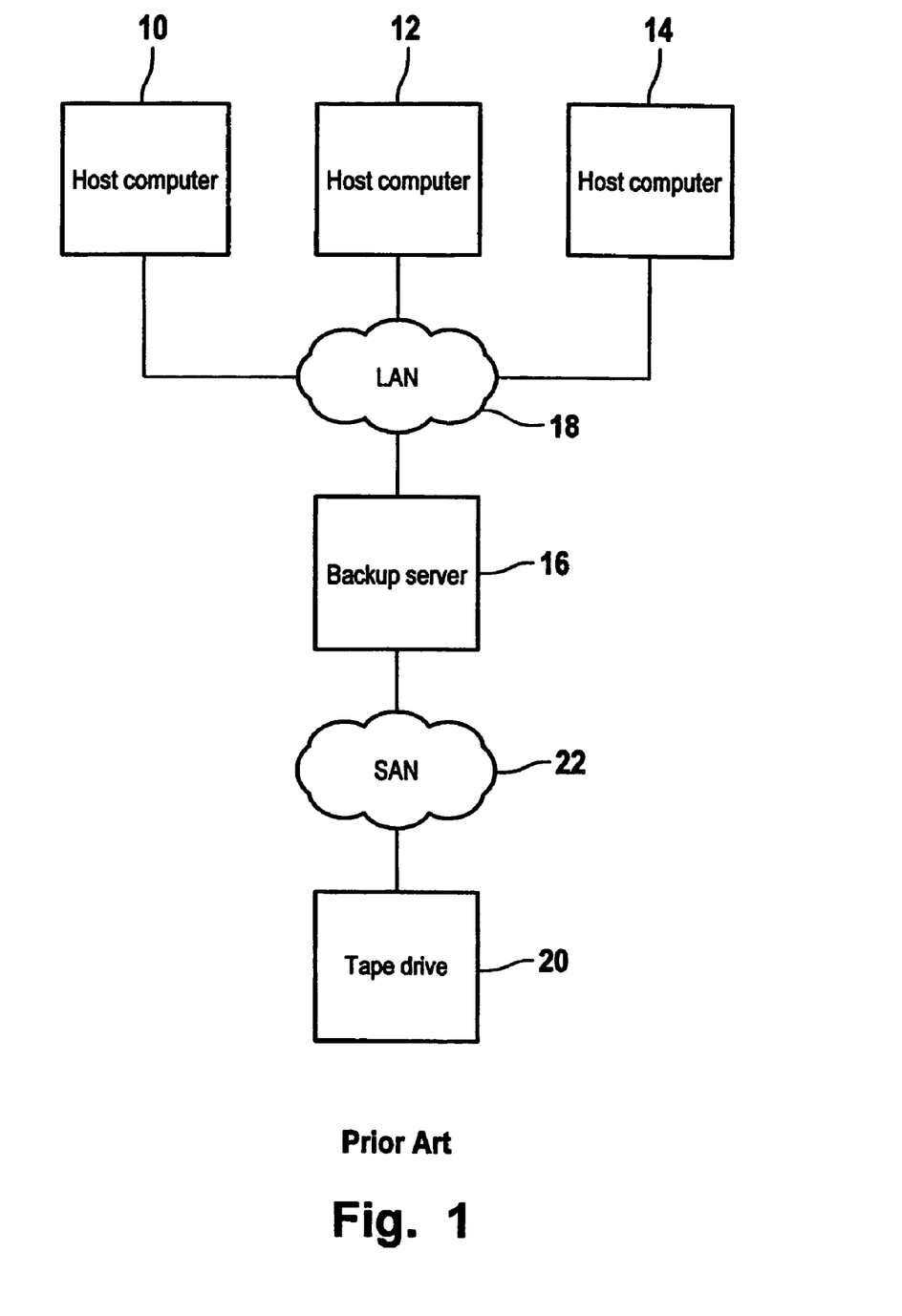
FIG. 1 is a block diagram of a prior art backup system which is based on a central backup server computer

FIG. 1 shows a block diagram of a prior art computer system which enables interleaved backups. Host computers 10, 12, 14 are coupled to backup server computer 16 by means of network 18. For example network 18 is a local area network (LAN). Backup server computer 16 is coupled to tape drive 20 by means of storage area network (SAN) 22.

In operation the backup server computer 16 communicates with the host computers 10, 12 and 14 over network 18 in order to pull the backup data from the host computers 10, 12 and 14. The backup server computer interleaves the respective data streams received from host computers 10, 12 and 14 before sending the single interleaved data stream to tape drive 20 via storage area network 22.

This approach has the primary disadvantage that backup server computer 16 serves as a central hub for the entire backup process. This implies that the backup server computer must be capable of handling the high data rates of the backup data from the host computers at both its inputs and its output. Further this requires sophisticated backup software and makes restoring the data dependent on that particular interleaving capability.

Another disadvantage is that the streaming of the backup data from the host computers to the backup server computer over the network 18 may saturate the transmission capacity of the network 18. This is a severe problem as network 18 is often a production network that is required for ongoing operational activities and is not optimised for storage activities.

An example of a technology that may be used for backup is the linear tape-open (LTO) technology. LTO technology is an "open format" technology, which means that users can have multiple sources of media and compatible tape drives. The ULTRIUM format is the "high capacity" implementation of LTO technology.

Tape drives and tape cartridges which are compliant with ULTRIUM LTO are commercially available from Hewlett Packard and others. A LTO compliant cartridge has a non-volatile cartridge memory (LTO-CM) which is an intelligent memory chip embedded in the cartridge. It uses a radio frequency interface that eliminates the need for a physical power or signal connection between cartridge and tape drive. The LTO-CM is used for storing information which in other tape formats may be stored in the header at the beginning of the tape.

SUMMARY OF THE INVENTION

The present invention provides for a method of storing data of at least first and second data sources on a single secondary storage device, such as a tape drive. A number of secondary storage devices are emulated by the single secondary storage device.

The emulated secondary storage devices receive data from the data sources which is tagged with respective unique identifiers of the data sources. The tagged data is stored on a storage medium, such as a tape. This way the invention facilitates coupling a plurality of data sources to a single secondary sequential storage device without the usual problems. This is in contrast to prior art backup systems where there is usually a one to one relationship between data sources, e.g. host computers, and secondary storage devices, e.g. tape drives. The present invention is particularly advantageous as it facilitates maximum usage of the available media access bandwidth of a secondary storage device, such as a tape drive.

It is to be noted that the present invention is particularly useful for storing of backup data streams originating from a plurality of host computers on a single sequential storage device, such as a tape drive. However, the invention can also be used for storing of such data streams on random access storage devices.

In accordance with a preferred embodiment of the invention a plurality of host computers is coupled to the single secondary storage device via a storage area network (SAN). A SAN connects a group of hosts to their shared storage devices, such as disks, disk arrays and tape drives, through an interconnection fabric which typically comprises hubs, switches and links.

Usually FibreChannel is used as the communication protocol in a SAN. Communication links are established through the SAN between each one of the host computers and respective dedicated emulated secondary storage devices provided by the single secondary storage device. Backup data is received by the emulated secondary storage devices from the host computers. The backup data is interleaved in order to provide a single data stream which is stored on a removable storage medium by the single secondary storage device.

In accordance with a preferred embodiment of the invention each data source has a predefined unique identifier. In the case of a SAN the world wide names (WWN) of the network interfaces of the host computers can be used as such unique identifiers. WWNs of the host computer systems are communicated to the emulated secondary storage devices when the communication links are established by means of the Fibre-Channel protocol. The WWNs or a portion of the WWNs can be used for tagging of the backup data before interleaving.

Alternatively, a mapping may be established between the WWNs and simple indexes, and these indexes then used to tag the data. The mapping table would then be stored either on the tape medium or in the cartridge memory.

In accordance with a further preferred embodiment of the invention a look up table is generated which comprises the unique identifiers and host computer details, such as host computer names. The look up table is stored on non-volatile memory of the storage medium; for example, the non-volatile memory is a memory chip being attached to a tape cartridge and which is accessed via a RF interface or by a set of electrical contacts from the tape storage device. In the case of an ULTRIUM tape the look up table is stored in the LTO-CM. Alternatively the look up table is stored on the tape itself.

In the case of a restore being needed to the host computer that originally performed the backup, the host computer would identify itself to the tape drive through its WWN. The tape drive would then only route data back to that host that was originally flagged with that host's WWN. Data that is identified as being from other hosts would be passed over.

One way of using the look up table is for replacing the host computer such as for disaster recovery or migration where the original identifier (the WWN) is no longer available. Initially it is necessary to recreate a suitable system on which to restore the data, including all hardware, the basic operating system, and a restore application. Then, the look up table is visualised on the user interface of the replacement host computer system for a user's selection of the original host which is to be replaced. The unique identifier of the replacement host computer system is communicated to the single secondary storage device for mapping of the unique identifier of the original host computer system to the unique identifier of the replacement host computer system. This way data which is tagged with the unique identifier of the original host computer system is restored to the replacement host computer system.

It is to be noted that the present invention is not restricted to tape storage devices having a single tape drive. The present invention can also be applied to tape libraries which comprise multiple tape drives.

BRIEF DESCRIPTION OF THE DRAWINGS

In the following preferred embodiments of the invention will be described, by way of example, and with reference to the drawings in which.

DETAILED DESCRIPTION

Figure 2:
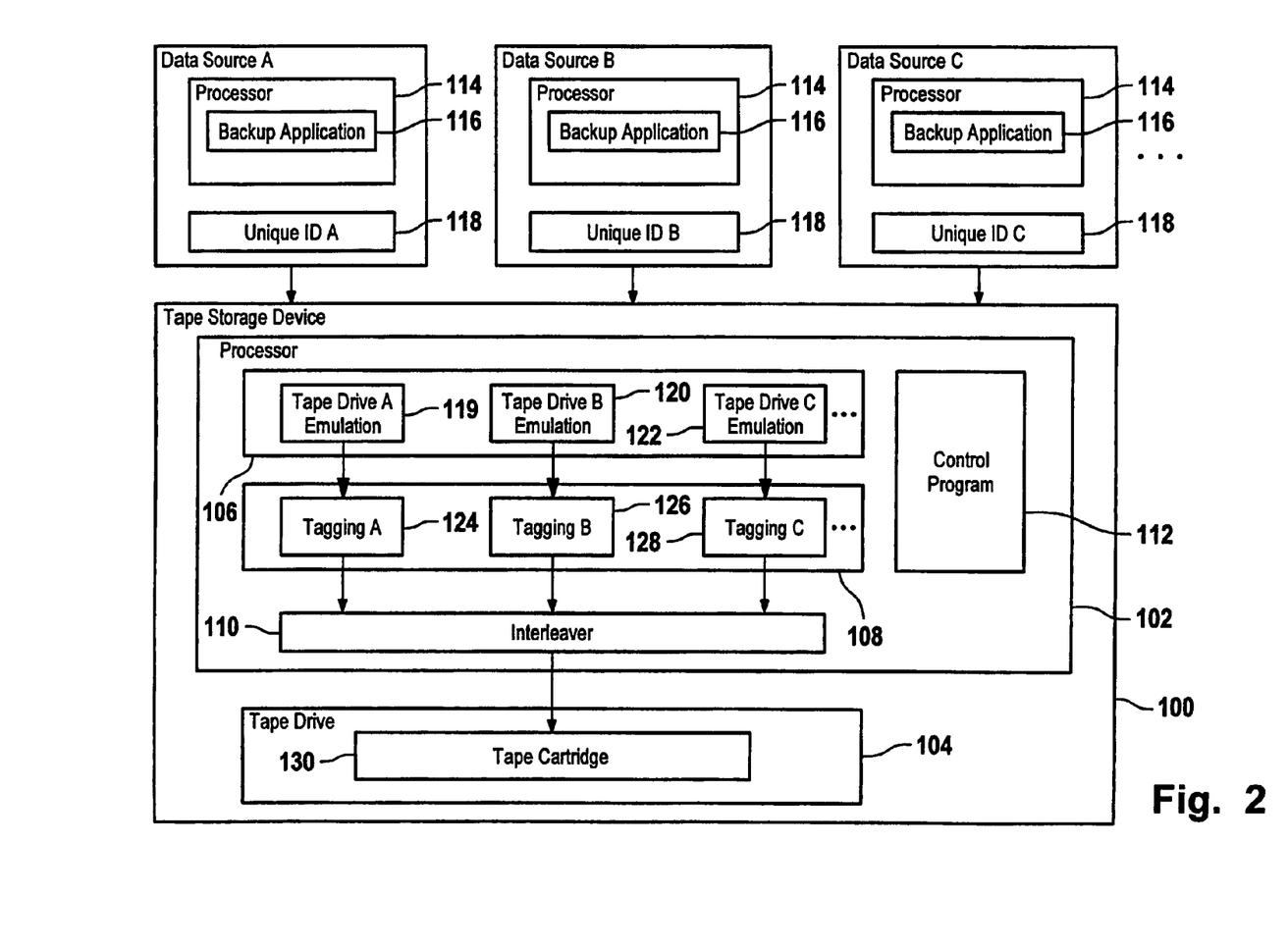
FIG. 2 is a block diagram of a backup system for multiple data sources.

FIG. 2 shows tape storage device 100 having processor 102 and tape drive 104. Processor 102 executes emulation program component 106 for emulation of multiple tape drives and tagging program component 108 for tagging of backup data received by the emulated tape drives with the respective identifiers. The tagged data is interleaved by interleaver 110.

Control program 112 controls operation of the various components of tape storage device 100, in particular tape drive 104. A number of data sources, A, B, C, . . . are coupled to tape storage device 100. Each one of the data sources A, B, C, . . . has a processor 114 which runs backup application 116. Each one of the data sources A, B, C, . . . has storage 118 for storage of a unique identifier (ID).

Emulation program component 106 provides a virtual tape drive for each one of the data sources, A, B, C, . . . which are coupled to tape storage device 100. In other words emulation program component 106 provides emulation 119 of virtual tape drive A which is coupled to data source A. Likewise emulation program component 106 provides emulation 120 of virtual tape drive B which is coupled to data source B and emulation 122 of tape drive C which is coupled to data source C, etc.

Tagging program component 108 has modules 124, 126, 128, . . . for tagging of data. Module 124 is assigned to emulation 119 and tags data which are received by emulation 119 with a unique identifier of data source A. Likewise module 126 is assigned to emulation 120 and tags data received by emulation 120 from data source B with unique identifier B. Module 128 is assigned to emulation 122 and tags data which are received by emulation 122 from data source C with unique identifier C, etc.

In operation tape cartridge 130 is inserted into tape drive 104. Data sources A, B, C, . . . are coupled to tape storage device 100 and backup applications 116 on data sources A, B, C, . . . are started. Backup application 116 of data source A communicates with emulation 119 of tape storage device 100 and sends backup data from data source A to emulation 119. Emulation 119 forwards the data received from data source A to module 124 where the data is tagged with the unique identifier A.

Likewise backup application 116 of data source B sends data to emulation 120 which forwards the data to module 126. Module 126 tags the data with the unique identifier B of data source B. The same applies analogously to the further emulations 122, . . . of emulation program component 106 and modules 128, . . . of tagging program component 108.

The tagged data of data sources A, B, C, . . . is provided from tagging program component 108 to interleaver 110 where the tagged data is interleaved to provide a data stream from interleaver 110 to tape drive 104; the data stream is written onto tape contained in tape cartridge 130. Overall operation of tape storage device 100 is controlled by control program 112.

Figure 3:
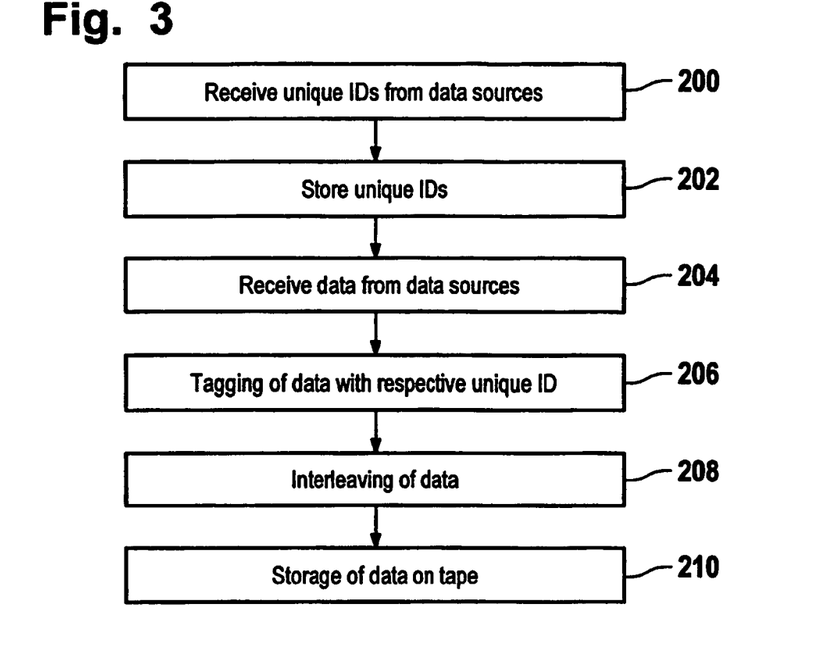
FIG. 3 is a flow chart of a backup method.

FIG. 3 shows a corresponding method. In step 200 the tape storage device receives the unique identifiers from various data sources which are coupled to the tape storage device. The unique identifiers of the various data sources are stored by tape storage device in step 202.

In step 204 the tape storage device emulates a tape drive for each one of the data sources; by means of the emulated tape drives the tape storage device receives respective data from the various data sources (step 204).

In step 206 the data is tagged with the respective unique identifier of the data source from which the data originates. In step 208 the tagged data is interleaved to provide a data stream which is stored on tape in step 210. This way a single tape storage device can be used by a plurality of data sources in order to make maximum usage of the media access bandwidth provided by the tape drive.

Figure 4:
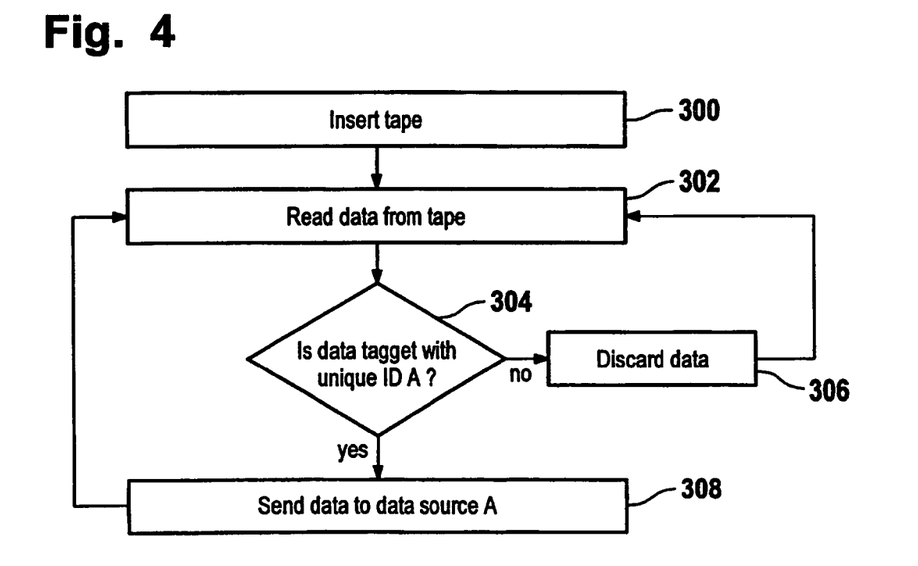
FIG. 4 is a flow chart of a restore method.

FIG. 4 shows a flow chart for performing a restore operation. In step 300 a tape on which backup data has been stored in accordance with the method of FIG. 3 is inserted into the tape drive. In step 302 data is read from the tape. In step 304 it is determined whether the data is tagged with the unique identifier of the data source for which the restore operation is performed. Without restriction of generality it is assumed that the data source for which the restore operation is performed is the data source A. If the data is tagged with the unique identifier of the data source A the data is sent to the data source A in step 308 from which the control returns to step 302. If the contrary is the case the data is ignored in step 306 and the control goes back to step 302.

Figure 5:
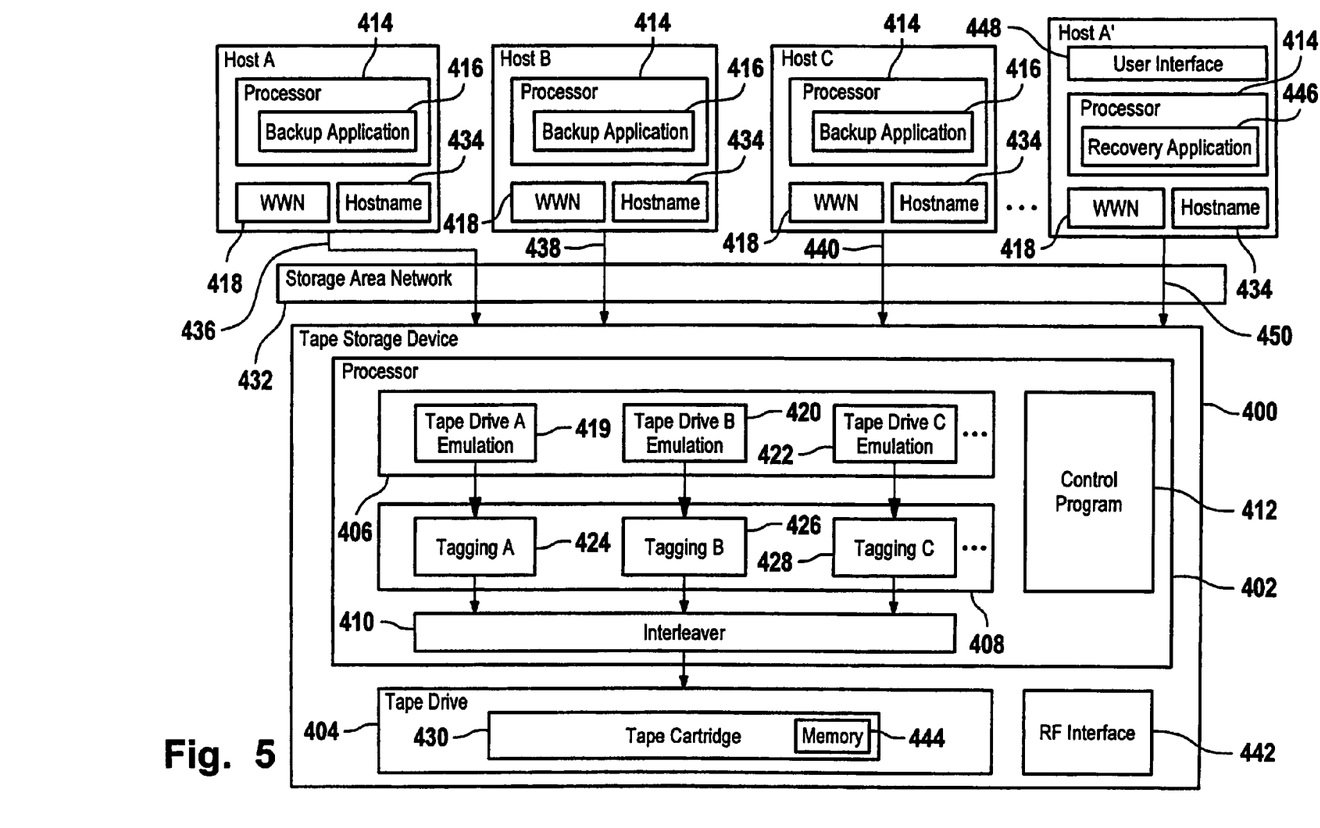
FIG. 5 is a block diagram of a SAN-based backup system.

FIG. 5 shows a block diagram of a number of host computer systems, i.e. host A, B, C, . . . which are coupled through storage area network 432 to tape storage device 400. Elements of the embodiment of FIG. 5 which correspond to elements of the embodiment of FIG. 2 are designated with like reference numerals having added 300.

In the case of a storage area network each one of the hosts has a unique world wide name (WWN) which is stored in memory 418. In addition each one of the hosts A, B, C, . . . can have an assigned host name which is stored in memories 434. When communication links 436, 438, 440, . . . between hosts A, B, C, . . . and respective ones of emulations 419, 420, 422, . . . are established the WWNs of the hosts are transmitted to tape storage device 400.

Further tape storage device 400 has RF interface 442 to non-volatile memory 444 arranged on tape cartridge 430. Preferably non-volatile memory 444 is an LTO-CM cartridge memory. By means of RF interface 442 data can be written to non-volatile memory 444 and read from non-volatile memory 444 by tape storage device 400 under control of control program 412.

In operation communication links 436, 438, 440 are established by means of the FibreChannel protocol between host A and emulation 419, host B and emulation 420, host C and emulation 422, etc. When the communication links 436, 438, 440 are formed the WWNs of host A, B, C, . . . are communicated to tape storage device 400 via the FibreChannel protocol. In addition the respective host names can be transmitted to the tape storage device 400 when the communication links 436, 438, 440, . . . are formed. One way of implementing the functionality is additional software to run on each host computer. This can be a separate application that was to run before of after the backup application, or it can be included in a development of the backup application.

Additionally, the tape drive control program 412 supports a capability to accept a specific command that is used to update its look-up table. Control program 412 assigns a unique identifier to each WWN and corresponding host name. The resulting look up table is stored in memory 444 through RF interface 442. Alternatively the look up table can also be stored directly on the tape of tape cartridge 430, or on the tape and non-volatile memory for redundancy.

When data is received from the host A, B, C, . . . by the respective emulations 419, 420, 422, the data is forwarded to modules 424, 426, 428, . . . for tagging with the respective identifiers which have been assigned to the WWNs and host names by control program 412. After interleaving by interleaver 410 the resulting data stream is stored by tape drive 404 on tape contained in tape cartridge 430.

One of the hosts A, B, C, . . . may need replacement for various reasons, such as migration to a more powerful host computer system or due to loss of a host computer because of fire, theft, etc. For example host A needs to be replaced by host A'. Host A' has recovery application 446 which is executed by processor 414. Recovery application 446 generates user interface 448.

In order to initiate the replacement of A by host A', host A' is coupled to storage area network 432 and communication link 450 is established between host A' and tape storage device 400, i.e. emulation 419, by means of the FibreChannel protocol. Tape cartridge 430 containing the tape with the backup data is inserted in tape drive 404 and the look up table which is stored in non-volatile memory 444 is read by means of RF interface 442.

The look up table is transmitted from tape storage device 400 to host A' via communication link 450. Recovery application 446 visualises the look up table on user interface 448. A user can select one of the host names of the look up table in order to specify which one of the hosts needs replacement. In the example considered here the user selects the host name of host A. This user selection as well as the WWN and host name of host A' are transmitted over communication link 450 to tape storage device 400. Control program 412 maps the unique identifier A which had been assigned to host A to the WWN and host name of the replacement host A'.

Next data packets which are tagged with the unique identifier A of the host A are read from the tape contained in tape cartridge 430 by means of tape drive 404. These data packets are sent by control program 412 to host A' over communication link 450. This way the backup data of host A is provided to replacement host A'.

Figure 6:
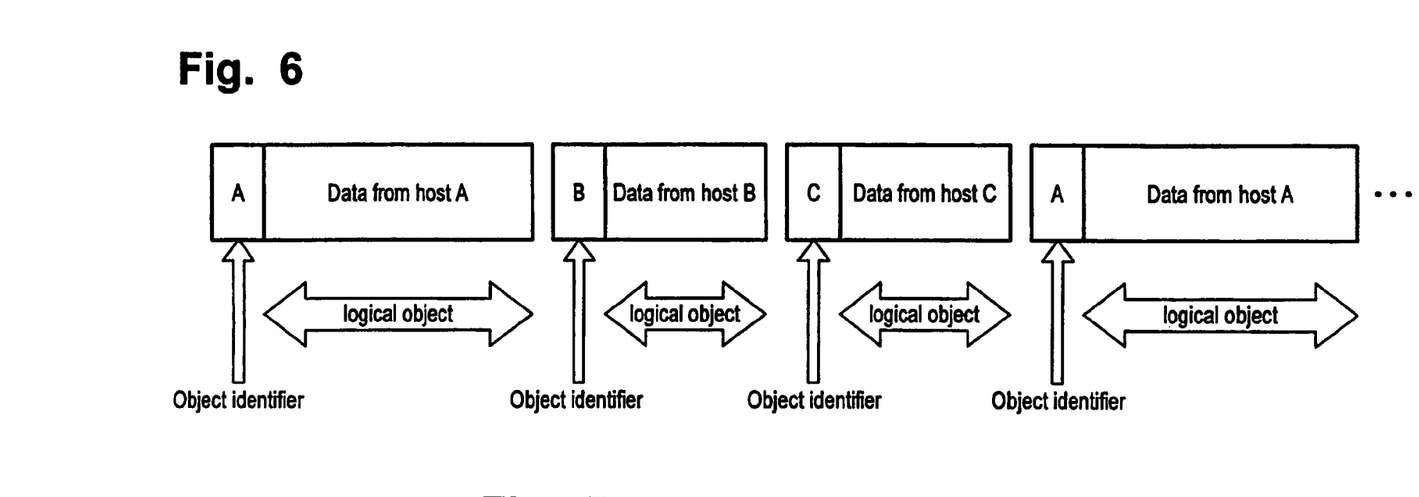
FIG. 6 illustrates the tagging of logical objects with identifiers.

FIG. 6 illustrates the tagging of backup data of logical objects received by the tape storage device from the host computers. A logical object is comprised of a sequential stream of data transferred from a host computer in a single write-to-tape operation.

A logical object which is received by the tape storage device from host A is tagged with the unique identifier A which is assigned to that host computer A. The unique identifier A serves to unequivocally identify that logical object as originating from host A. Likewise a logical object received from host B is tagged with unique identifier B, etc. Preferably a logical object which is received from one of the hosts in a single transaction is tagged with a single unique identifier.

Figure 7:
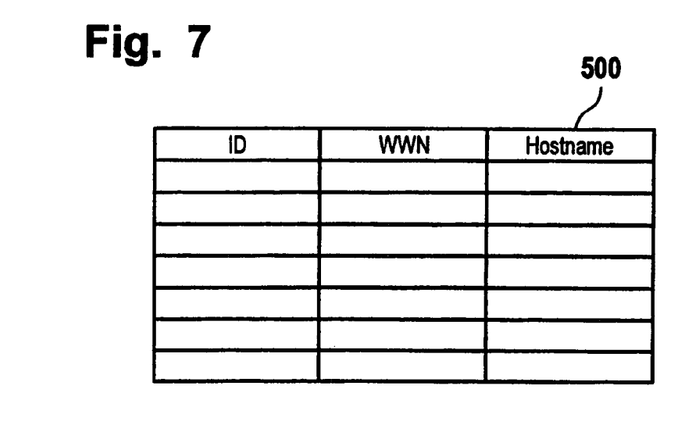
FIG. 7 illustrates a look up table.

FIG. 7 shows look up table 500 which is stored on non-volatile memory of the tape cartridge (cf. memory 444 of FIG. 4). Each row of look up table 500 has three entries, i.e. a unique identifier (ID), a WWN and a host name. For example one row of look up table 500 contains the host name of host A, the WWN of host A and the unique identifier which has been assigned to host A by the control program of the tape storage device.

Figure 8:
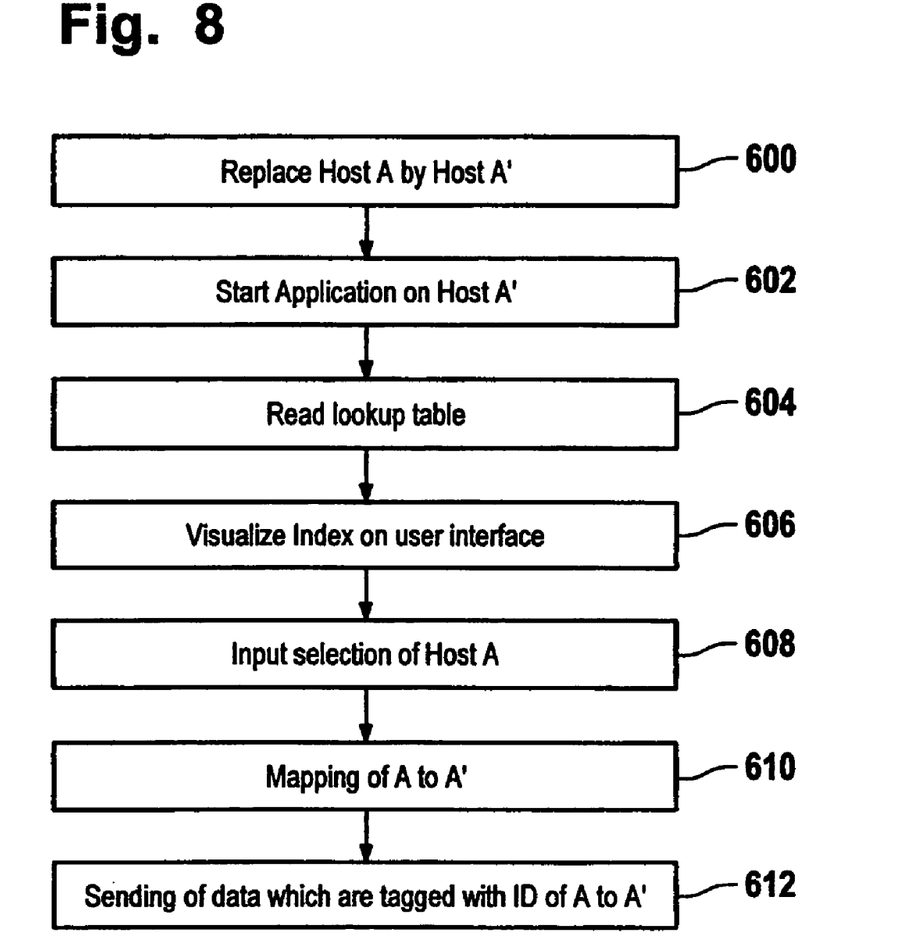
FIG. 8 is a flow chart of a host computer replacement method, such as for the purposes of disaster recovery or migration.

FIG. 8 shows a corresponding flow chart. In step 600 the host A is physically replaced by host A', such as for the purpose of migration or disaster recovery. In step 602 a recovery application program is started on host A'. In step 604 the look up table (cf. look up table 500 of FIG. 5) is read from the non-volatile memory of the tape cartridge. The look up table is visualised on the user interface of host A' in step 606 by the recovery application program.

In step 608 a user inputs his or her selection of the host which needs to be replaced, which is host A in the example considered here. In step 610 the WWN and host name of the replacement host A' are assigned to the original unique identifier of host A. This way a logical mapping of host A to host A' is performed for the purposes of the recovery procedure. In step 612 the backup data which is tagged with the unique identifier of host A is sent to host A'.

REFERENCE NUMERALS

100 Tape storage device
102 Processor
104 Tape drive
106 Emulation program component 108 Tagging program component
110 Interleaver
112 Control program
114 Processor
116 Backup application
118 Memory
119 Emulation
120 Emulation
122 Emulation
124 Module
126 Module
128 Module
130 Tape cartridge
400 Tape storage device
402 Processor
404 Tape drive
406 Emulation program component
408 Tagging program component
410 Interleaver
412 Control program
414 Processor
416 Backup application
419 emulation
420 Emulation
122 Emulation
424 Module
426 Module
428 Module
430 Tape cartridge
432 Storage area network
434 Memory
436 Communication link
438 Communication link
440 Communication link
442 RF interface
444 Non-volatile memory
446 Recovery application
448 User interface
450 Communication link
500 Look up table

The invention claimed is:

1. A method of storing data from at least first and second data sources using a single secondary storage device, the method comprising:

emulating at least a first secondary storage device and a second secondary storage device using the single secondary storage device, receiving first data from the first data source using the emulated first secondary storage device and tagging the received first data with a unique identifier of the first data source, receiving second data from the second data source using the emulated second secondary storage device and tagging the received second data with a unique identifier of the second data source, storing the tagged first and second data on a storage medium using the single secondary storage device, identifying data packets tagged with the unique identifier of at least one of the first data source or the second data source in a sequence of data packets stored on a removable storage medium, wherein the unique identifier of the at least one of the first data source or the second data source comprises a world wide name (WWN), and replacing at least one of the first data source or the second data source by a replacement data source and mapping the unique identifier of the at least one of the first data source or the second data source to the unique identifier of the replacement data source for restoring the identified data packets to the replacement data source.

2. The method of claim 1, wherein the first and second data sources are first and second host computers.

3. The method of claim 1, the at least first and second data sources being coupled to the single secondary storage device via a storage area network (SAN).

4. The method of claim 1, further comprising establishing a first communication link between the first data source and the emulated first secondary storage device and establishing a second communication link between the second data source and the emulated second secondary storage device, wherein the first and second communication links are established by means of a fibre channel protocol.

5. The method of claim 1, further comprising receiving the unique identifier of the first data source from the first data source and receiving the unique identifier of the second data source from the second data source.

6. The method of claim 1, wherein the unique identifier of the first data source is the world wide name (WWN) of the first data source and the unique identifier of the second data source is the world wide name of the second data source.

7. The method of claim 1, wherein the first and second data are received as first and second data packets, and further comprising tagging each one of the data packets with the respective unique identifier and interleaving of the tagged data packets for sequential storage on the storage medium by the single secondary storage device.

8. The method of claim 1, further comprising storing in non-volatile memory an index comprising at least one of the unique identifiers.

9. The method of claim 8, the non-volatile memory being the storage medium.

10. The method of claim 8, the non-volatile memory being a cartridge memory of the storage medium.

11. The method of claim 8, the index comprising a mapping table of at least one of the unique identifiers and respective names of at least one of the first data source or the second data source.

12. The method of claim 1, the single secondary storage device being a tape drive residing in a tape library comprising a plurality of tape drives.

13. The method of claim 1, further comprising:
restoring the identified data packets to the data source.

14. The method of claim 1, whereby the data source is replaced for the purpose of disaster recovery or migration.

15. The method of claim 1, further comprising:
reading a look up table from non-volatile memory of the removable storage medium, the look up table comprising unique identifiers of one or more data sources;
presenting the look up table on a user interface;
enabling selection of the first data source and the replacement data source by a user via the user interface;
mapping the unique identifier of the replacement data source to the unique identifier of the first data source;
identifying data packets tagged with the unique identifier of the first data source in a sequence of data packets stored on the removable storage medium; and
restoring the identified data packets to the replacement data source.

16. A non-transitory computer readable medium comprising logic instructions stored on the non-transitory computer readable medium which, when executed by a process, configure the processor to store data of at least first and second data sources using a single secondary storage device, by performing operations, comprising:

emulating at least a first secondary storage device and a second secondary storage device by using the single secondary storage device, receiving first data from the first data source using the emulated first secondary storage device and tagging the received first data with a unique identifier of the first data source, receiving second data from the second data source using the emulated second secondary storage device and tagging the received second data with a unique identifier of the second data source, storing the tagged first and second data on a storage medium using the single secondary storage device, identifying data packets tagged with the unique identifier of at least one of the first data source or the second data source in a sequence of data packets stored on a removable storage medium, wherein the unique identifier of the at least one of the first data source or the second data source comprises a world wide name (WWN), and mapping the unique identifier of the at least one of the first data source or the second data source to a unique identifier of a replacement data source in order to restore the identified data packets to the replacement data source.

17. The non-transitory computer readable medium of claim 16, further comprising logic instructions stored in the non-transitory computer readable medium which, when executed by the processor, configure the processor to store a list of the unique identifiers and respective names of the data sources on non-volatile memory.

18. The non-transitory computer readable medium of claim 16, further comprising a program for:
restoring the identified data packets to the data source.

19. The non-transitory computer readable medium of claim 16, the non-transitory computer readable medium or device comprising a program for:
reading a look up table from non-volatile memory of the removable storage medium, the look up table comprising unique identifiers of one or more data sources;
presenting the look up table on a user interface;
enabling selection of the first data source and the replacement data source by a user via the user interface;
mapping the unique identifier of the replacement data source to the unique identifier of the first data source;
identifying data packets tagged with the unique identifier of the first data source in a sequence of data packets stored on the removable storage medium; and
restoring the identified data packets to the replacement data source.

20. A tape drive comprising logic instructions stored on a computer readable medium which, when executed by a processor coupled to the tape drive, cause the tape drive to:
emulate at least first and second tape drives,
receive first data from a first data source using the emulated first tape drive and tag the received first data with the unique identifier of the first data source,
receive second data from the second data source using the emulated second tape drive and tag the received second data with the unique identifier of the second data source,
store the tagged first and second data on a tape medium,
identify data packets tagged with the unique identifier of at least one of the first data source or the second data source in a sequence of data packets stored on a removable storage medium, wherein the unique identifier of the at least one of the first data source or the second data source comprises a world wide name (WWN), and
map the unique identifier of the at least one of the first data source or the second data source to a unique identifier of a replacement data source in order to restore the identified data packets to the replacement data source.

21. The tape drive of claim 20, wherein the tape drive is coupled to at least first and second host computers providing the first and second data sources, respectively.

22. A tape library comprising a plurality of tape drives, at least one of the tape drives of the plurality of tape drives comprising logic instructions stored on a computer readable medium which, when executed by a processor coupled to the tape drive, cause the tape drive to:
emulate at least first and second tape drives;
receive first data from a first data source using the emulated first tape drive and tag the received first data with the unique identifier of the first data source,
receive second data from the second data source using the emulated second tape drive and tag the received second data with the unique identifier of the second data source, and
store the tagged first and second data on a tape medium
identify data packets tagged with the unique identifier of at least one of the first data source or the second data source in a sequence of data packets stored on a removable storage medium, wherein the unique identifier of the at least one of the first data source or the second data source comprises a world wide name (WWN) and
map the unique identifier of the at least one of the first data source or the second data source to a unique identifier of a replacement data source in order to restore the identified data packets to the replacement data source.

* * * * *

UNITED STATES PATENT AND TRADEMARK OFFICE
CERTIFICATE OF CORRECTION

| | | |
|---|---|---|
| PATENT NO. | : 7,979,647 B2 | Page 1 of 1 |
| APPLICATION NO. | : 10/949191 | |
| DATED | : July 12, 2011 | |
| INVENTOR(S) | : Andrew Topham et al. | |

It is certified that error appears in the above-identified patent and that said Letters Patent is hereby corrected as shown below:

In column 8, line 64, in Claim 16, delete "process," and insert -- processor, --, therefor.

Signed and Sealed this
Twenty-ninth Day of November, 2011

David J. Kappos
*Director of the United States Patent and Trademark Office*